United States Patent
Runge

(10) Patent No.: US 11,772,755 B2
(45) Date of Patent: Oct. 3, 2023

(54) FLOATABLE OFFSHORE WIND TURBINE

(71) Applicant: Jörn Runge, Marklohe (DE)

(72) Inventor: Jörn Runge, Marklohe (DE)

(73) Assignee: RWE Renewables GmbH, Essen (DE)

( * ) Notice: Subject to any disclaimer, the term of this patent is extended or adjusted under 35 U.S.C. 154(b) by 0 days.

(21) Appl. No.: 18/118,579

(22) Filed: Mar. 7, 2023

(65) Prior Publication Data

US 2023/0219661 A1 Jul. 13, 2023

Related U.S. Application Data

(63) Continuation of application No. PCT/EP2021/072219, filed on Aug. 10, 2021.

(30) Foreign Application Priority Data

Sep. 8, 2020 (DE) .................... 10 2020 123 375.2

(51) Int. Cl.
| | | |
|---|---|---|
| B63B 39/03 | (2006.01) | |
| F03D 13/25 | (2016.01) | |
| B63B 21/50 | (2006.01) | |
| B63B 35/44 | (2006.01) | |

(52) U.S. Cl.
CPC .............. B63B 39/03 (2013.01); B63B 21/50 (2013.01); B63B 35/44 (2013.01); F03D 13/25 (2016.05); B63B 2035/446 (2013.01); F05B 2240/95 (2013.01)

(58) Field of Classification Search
CPC ......... B63B 39/03; B63B 21/50; B63B 35/44; F03D 13/25
See application file for complete search history.

(56) References Cited

U.S. PATENT DOCUMENTS

| | | | |
|---|---|---|---|
| 2011/0140426 A1* | 6/2011 | Garcia Lopez | ......... B63B 35/44 290/55 |
| 2014/0044541 A1* | 2/2014 | Dupin De La Gueriviere | ............ F03D 17/00 416/85 |

FOREIGN PATENT DOCUMENTS

| | | | | |
|---|---|---|---|---|
| AU | 2014400184 A1 * | 2/2017 | ............. | B63B 1/107 |
| CN | 108407987 A * | 8/2018 | ............. | B63B 21/50 |
| CN | 108454799 A * | 8/2018 | ............. | B63B 21/50 |
| DE | 102 19 062 A1 | 11/2003 | | |
| DE | 103 06 225 A1 | 9/2004 | | |
| DE | 102007043268 A1 * | 3/2009 | ............. | B63B 21/26 |
| DE | 10 2009 057 794 A1 | 6/2011 | | |
| DE | 10 2012 007 613 A1 | 10/2013 | | |

(Continued)

*Primary Examiner* — S. Joseph Morano
*Assistant Examiner* — Jovon E Hayes
(74) *Attorney, Agent, or Firm* — Reinhart Boerner Van Deuren P.C.

(57) ABSTRACT

The application relates to a floatable offshore wind turbine with at least one floatable foundation. The floatable foundation includes at least one floating body. The floatable offshore wind turbine includes at least one anchoring arrangement configured to fix the offshore wind turbine to an underwater ground while the offshore wind turbine is in its anchoring state. Further, the floatable offshore wind turbine includes at least one height adjustment device configured to change the vertical distance of the floatable foundation to an underwater ground surface of the underwater ground and/or to a water surface during the anchoring state based on at least one specific meteorological environmental parameter of the offshore wind turbine.

10 Claims, 10 Drawing Sheets

(56) References Cited

FOREIGN PATENT DOCUMENTS

| | | | | |
|---|---|---|---|---|
| DE | 102014 109 212 A1 | | 1/2016 | |
| DE | 102020123374 A1 * | | 3/2022 | ............. B63B 21/50 |
| EP | 2 684 792 A1 | | 1/2014 | |
| ES | 2555500 A1 * | | 1/2016 | ............. B63B 21/20 |
| KR | 102 144 423 B1 | | 8/2020 | |

* cited by examiner

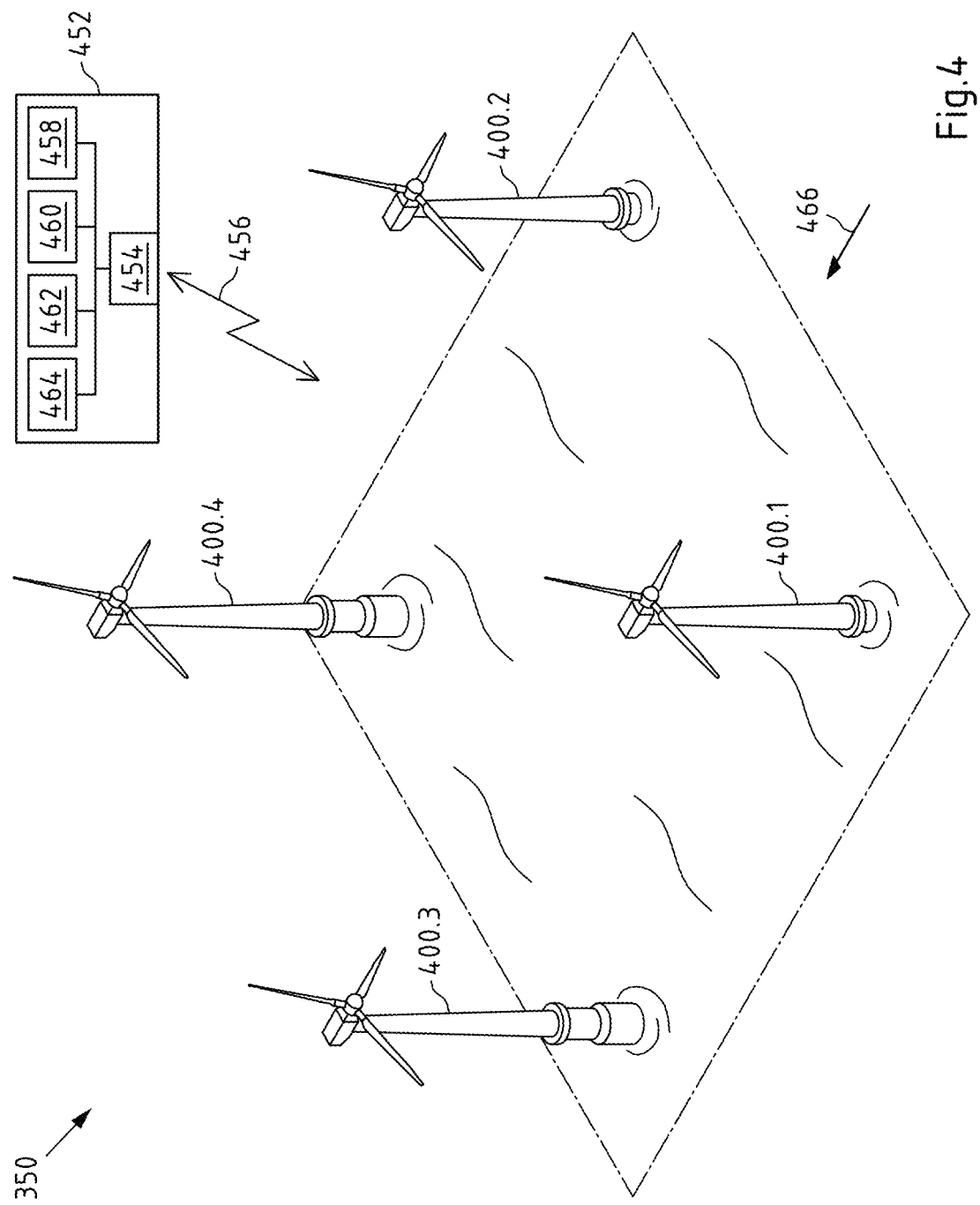

FLOATABLE OFFSHORE WIND TURBINE

CROSS-REFERENCE TO RELATED PATENT APPLICATIONS

This patent application is a continuation of International Application No. PCT/EP2021/072219, filed on Aug. 10, 2021, which claims the benefit of priority to German Patent Application No. 10 2020 123 375.2, filed Sep. 8, 2020, the entire teachings and disclosures of both applications are incorporated herein by reference thereto.

FIELD

The application relates to a floatable offshore wind turbine comprising at least one floatable foundation, comprising at least one floating body, and at least one anchoring arrangement configured to fix the offshore wind turbine to an underwater ground in an anchoring state of the offshore wind turbine. In addition, the application relates to an offshore wind farm, a method, and a floatable foundation.

BACKGROUND

Wind energy systems and wind farms, respectively, with at least one wind turbine are increasingly being used to provide electrical energy from so-called renewable energy sources. A wind turbine is configured in particular to convert the kinetic wind energy into electrical energy.

In order to increase the energy yield of such systems, wind farms are increasingly located at sites with a high wind probability. Offshore locations in particular are usually characterized by relatively continuous wind conditions and high average wind speeds so that so-called offshore wind energy systems and offshore wind farms, respectively, are increasingly being built.

Usually, an offshore wind farm comprises a plurality of offshore structures, such as a plurality of offshore wind turbines and at least one offshore substation, by which the offshore wind farm is electrically connected, for example, to an onshore substation or another offshore substation and offshore converter station, respectively.

An onshore substation, in turn, may be connected to a public power grid. In order to transmit electrical energy between two offshore structures or an offshore structure and an onshore structure, power cables are laid in the form of submarine cables.

While it has been common practice for offshore wind farms to be anchored by a foundation structure (e.g., monopile, tripod, tripile, or jacket foundations) on respectively in the underwater ground, in particular a seabed, there is increasing consideration of installing floating offshore structures, such as floating offshore wind turbines, in particular in areas with a large water depth, for example, of more than 150 meters.

A floatable respectively floating offshore wind turbine comprises at least one floatable foundation with at least one floating body. The wind power device with a wind turbine is installed on the floatable foundation.

For a (permanent) stationary operation of the offshore wind turbine, the offshore wind turbine is fixed to the underwater bottom (usually a seabed) by at least one anchoring arrangement. The at least one anchoring arrangement is configured to fix the offshore wind turbine to an underwater bottom in an anchoring state of the offshore wind turbine.

In the prior art, measurements and/or predictions of meteorological environmental parameters (e.g. average wind speed and direction) are carried out in advance. These serve as a basis for the installation of the offshore wind farm. Thus, the offshore wind turbines are installed on the basis of these measurements and/or predictions and, in particular, are aligned once in the main wind direction during installation.

While this may allow an installed floating offshore wind farm to be optimized with respect to a main meteorological environmental condition (i.e., a primarily prevailing meteorological environmental condition) and therefore, under corresponding actual meteorological conditions, the power generation is maximized, i.e., the power yield is optimized. However, the environmental conditions may change during the operation of the offshore wind farm. However, when the meteorological environmental condition changes, the power yield is low for the offshore wind farms known from the prior art.

BRIEF SUMMARY

Therefore, it is the object of the application to provide a floatable offshore wind turbine which allows maximizing the power yield of the offshore wind farm during stationary operation of the at least one offshore wind turbine even under changing meteorological environmental conditions.

According to a first aspect of the application, the problem is solved by a floatable offshore wind turbine. The offshore wind turbine comprises at least one floatable foundation comprising at least one floating body. The offshore wind turbine comprises at least one anchoring arrangement configured to fix the offshore wind turbine to an underwater ground in an anchoring state of the offshore wind turbine. The offshore wind turbine comprises at least one height adjustment device configured to change the vertical distance of the floatable foundation to an underwater ground surface of the underwater ground and/or to a water surface during the anchoring state based on at least one specific meteorological environmental parameter of the offshore wind turbine.

In particular, the height adjustment device may be configured to change the vertical distance of the floatable foundation to the underwater ground surface during the anchoring state based on at least one predetermined environmental meteorological condition and at least one specific respectively provided environmental meteorological parameter of the offshore wind turbine.

By providing, in contrast to the prior art, according to the application, a floatable offshore wind turbine in which the vertical distance to the underwater ground surface and thus the hub height of the offshore wind turbine can be changed depending on the (currently) measured and/or predicted meteorological conditions at the installation site of the offshore wind turbine, a maximization of the power yield of the offshore wind turbine, in particular of the offshore wind farm, is made possible (during stationary operation) even under changing meteorological environmental conditions.

In particular, an offshore wind turbine according to the application comprises a height adjustment device which, depending on the meteorological conditions at the installation site of the offshore wind turbine, allows an adjustment of the vertical distance between the foundation and the underwater ground surface at least between two different distances so that in particular the power generation can be optimized.

The offshore wind turbine according to the application is a floatable offshore wind turbine. The offshore wind turbine comprises at least one floatable foundation. In particular, the wind power device is arranged on the at least one foundation, comprising tower, nacelle, rotor, generator, etc.

The at least one floatable foundation comprises at least one floating body. A floating body and buoyancy body, respectively, is independently floatable in particular due to its buoyancy by displacement according to Archimedes' principle. Floating bodies may, for example, be hollow and filled with air or with a light solid material. In particular, the floatable foundation may substantially form the floating body.

The floatable foundation may preferably be a so-called barge foundation, semi-submersible foundation, spar foundation and/or tension leg platform (TLP) foundation. It shall be understood that other types of floatable foundations may be provided in other variants of the application.

According to the application, a floatable foundation is fixed respectively anchored to the underwater ground by means of at least one anchoring arrangement. In particular, a plurality (e.g., three or four) of anchoring arrangements may be provided for the fixation.

An anchoring arrangement according to the application may comprise an anchoring connection, in particular in the form of an anchor rope or an anchor chain. One end of the anchoring connection is fixed to the foundation and the other end is fixed to at least one anchor (e.g., weight anchor, torpedo anchor, etc.). The anchor may be at least partially buried in the underwater ground.

The state in which the foundation and thus the offshore wind turbine are fixed to the underwater ground by the at least one anchoring arrangement is referred to herein in particular as the anchoring state of the foundation and the offshore wind turbine, respectively.

According to the application, it has been recognized that the vertical distance (respectively the vertical height to the waterline) of the offshore wind turbine can be changed by a height adjustment device. In particular, it has been recognized that by a vertical height adjustment the power yield, in particular of the entire offshore wind farm, can be improved if the change of the vertical distance depends on at least one meteorological environmental parameter (currently present and/or predicted for a specific future time period).

The at least one specific meteorological environmental parameter is in particular a provided meteorological environmental parameter. In particular, this at least one parameter may be provided by at least one meteorological measuring device (e.g. measuring mast) of the offshore wind farm and/or a meteorological service. Depending on an evaluation of the at least one environmental meteorological parameter, the vertical height and vertical distance, respectively, may be changed (or left unchanged).

Preferably, the at least one specific environmental meteorological parameter and the at least one specific environmental meteorological condition can be evaluated. A meteorological environmental condition (respectively criterion) comprises in particular at least one meteorological environmental parameter range. During the evaluation, it can be checked whether or not the specific, in particular provided, environmental meteorological parameter lies within the at least one environmental parameter range. In other words, it can be checked whether the at least one meteorological environmental parameter (value) fulfills the at least one environmental condition or not.

Depending on this, the vertical distance between the foundation (for example, the underside can be the reference point) and the underwater ground surface (for example, the current surface of the underwater ground can be the further reference point) or between the foundation (for example, the underside can be the reference point) and the water surface can be changed, i.e. increased or reduced (or left unchanged). In other words, the vertical distance between the nacelle and the waterline can be changed, i.e. increased or reduced (or left unchanged).

It shall be noted that in the following, only a change in the vertical distance to the underwater ground surface is referred to. It shall be understood that, as a rule, a change in the vertical distance to the underwater ground surface is accompanied by a corresponding change in the vertical distance to the water surface.

According to an embodiment of the offshore wind turbine according to the application, at least a first environmental meteorological condition and a second environmental meteorological condition different from the first environmental condition may be provided. For example, in installation regions with two main wind directions (e.g., summer monsoon and winter monsoon), a corresponding first and second environmental meteorological condition may be provided. In other variants of the application, three or more different meteorological (typical) environmental conditions may also be provided.

Upon detecting that the first environmental meteorological condition is satisfied by the (at least one) specific environmental meteorological parameter (for example, detecting/checking whether the at least one specific environmental meteorological parameter is (or is not) within the at least one first environmental parameter range of the first environmental condition), the height adjustment device may be configured to change the vertical distance by adjusting a first vertical distance associated with the first environmental meteorological condition.

Upon detecting that the second environmental meteorological condition is satisfied by the specific environmental meteorological parameter (for example, detecting/checking whether the at least one specific environmental meteorological parameter is (or is not) within the at least one second environmental meteorological parameter range of the second environmental meteorological condition), the height adjustment device may be configured to change the vertical distance by adjusting a second vertical distance associated with the second environmental condition.

In particular, the described associations can be stored in a data memory arrangement. In a simple way, a change in the meteorological environmental condition at the installation site can cause a specific change in the vertical distance.

A setting of an associated vertical distance means in particular that the current distance is changed by a specific value. Preferably, a vertical distance to be set can be associated to each meteorological environmental condition, in particular in the form of a height set point. This height set point can be used to control a height adjustment device in such a way that it changes the vertical distance in accordance with the height set point.

According to a further embodiment of the offshore wind turbine according to the application, the at least one specific meteorological environmental parameter may be selected from the group comprising:
wind direction (measured and/or predicted),
wind strength (measured and/or predicted),
wave height (measured and/or predicted).

These meteorological environmental parameters are particularly relevant for power generation by an offshore wind turbine.

In particular, it has been recognized that the wave height can affect the tilt angle of the floatable offshore wind turbine and thus the electrical power that can be generated. If the tilt angle exceeds a specific limit (e.g., between 10° and 20°), then the electrical energy and power, respectively, that can be generated is reduced. For example, if the swell exceeds a specific limit (x m wave height), the distance to the underwater bottom surface can therefore be reduced. This can reduce the tilt angle and thus increase the yield.

Preferably, two, preferably all, of the aforementioned meteorological environmental parameters can be determined and, in particular, provided. In further variants of the application, alternatively or additionally, at least one further meteorological environmental parameter (e.g. rainfall, solar radiation, etc.) can be provided.

Furthermore, according to a preferred embodiment of an offshore wind turbine according to the application, the height adjustment device may comprise at least one ballast tank fillable with a ballast medium (preferably water, in particular seawater). Preferably, the at least one ballast tank may be integrated in the at least one foundation. Also, a ballast tank may be attached to the outer side of a foundation.

If two or more foundations and foundation elements, respectively, are provided, each foundation may have a ballast tank. The at least one ballast tank can be arranged in particular in such a way that filling/emptying results in a purely vertical movement of the foundation. In the case of a plurality of ballast tanks, the filling/emptying can in particular be controlled synchronously so that an almost uniform filling/emptying of the at least two ballast tanks can be conducted.

The height adjustment device may comprise at least one ballast medium conveying arrangement configured to change the level and/or the total density of the at least one ballast tank. The ballast medium conveying arrangement may be arranged in or on the foundation. By changing the filling level and/or the total density, in particular said vertical distance is changed. In this embodiment, a height set point may be a fill set quantity (e.g., full, half full, empty, x liters, etc.). According to a predefined such height set point, the ballast medium conveying arrangement can change the fill level and/or the total density of the ballast tank to change said vertical distance.

Particularly preferably, the ballast medium conveying arrangement can be at least one pumping device configured to change the filling level of the ballast tank by actively conveying the ballast medium into the ballast tank and/or by actively conveying the ballast medium out of the ballast tank. In particular, if an active conveying of the ballast medium out of the ballast tank is provided, filling can be performed passively by opening a tank opening. In particular, if an active conveying of the ballast medium into the ballast tank is provided, an emptying can be performed passively by opening a tank opening. Preferably, however, at least one pumping device can be provided for both filling and emptying.

The setting of a specific filling level can be controlled by a control module (preferably a control module with at least one suitable controller). A level measuring element can be used to monitor the level. This allows that a predefined height set point in the form of a fill set quantity can be set in a reliable manner.

Alternatively or additionally, according to a further embodiment of the offshore wind turbine according to the application, the height adjustment device may comprise at least one weight arrangement connected to the floatable foundation, which is changeable at least between a state lowered on the underwater ground surface and a state lifted from the underwater ground surface, for example by a suitable lifting device.

In particular, the weight arrangement may comprise a weight connection (e.g., an anchor rope and/or an anchor chain) that may be connected to the foundation. The other end of the weight connection may be connected to a weight element. In a lowered state, the weight element may be put down and lowered, respectively, on the underwater ground surface. In this state, in particular, substantially no weight force is exerted on the foundation by the at least one weight element of the weight arrangement.

In a lifted state, the weight element may be lifted from the underwater ground surface, i.e. no longer contacting it. In this state, in particular, a weight force (corresponding to the weight of the weight element of the weight arrangement) is exerted on the foundation by the at least one weight element of the weight arrangement. An adjustment between said states can cause a change in said vertical distance.

Furthermore, in a further embodiment of the offshore wind turbine according to the application, the offshore wind turbine may, alternatively or additionally, comprise at least one winch device coupled to at least one anchor connection. The winch device may be configured to change the length of the anchor connection between the anchor and the floatable foundation, i.e. in particular to shorten or lengthen it according to a height set point. In particular, the winch device comprises a substantially cylindrical and rotatable drum.

In the present case, coupled means in particular that the at least one anchor connection can be wound and unwound on the drum in the form of an anchor cable and an anchor chain, respectively, (in particular between a minimum and maximum length). One end of the anchor connection can be firmly attached to the drum or another attachment point of the winch device.

Preferably, the winch device can comprise at least one controllable and motor-based drive, in particular an electric motor that can be supplied with electrical energy from the offshore structure. The drive can be controlled by the control module in particular in such a way that the length is changed in such a way that the (current and/or predicted future) height and the vertical distance, respectively, (substantially) corresponds to the at least one height set point parameter or at least lies within the permissible position range.

According to a further embodiment, the winch device may comprise at least one parking brake. The parking brake may be releasable to change the length of the anchor connection (and lockable after the change). When a change in the length of the anchor connection is to occur, for example, the control module may control the parking brake so that it is released. Then, in particular by the drive, the length of the anchor connection can be changed as described. Subsequently, the parking brake can be locked (again) automatically or by a renewed control by e.g. the control module. The load on the drive can be reduced in this way.

By changing the length of an anchor connection, the vertical distance can be changed accordingly. It shall be understood that when using a winch device, it may be necessary to embed an anchor deeper in the underwater ground and/or increase the weight of the anchor (compared to the case where no winch device is provided).

A further aspect of the application is an offshore wind farm. The offshore wind farm comprises a plurality of previously described offshore wind turbines. The offshore wind farm comprises at least one height control apparatus configured to control at least one first height adjustment device of an offshore wind turbine with a height set point for causing a change of a vertical distance of a floatable foundation of the offshore wind turbine to the underwater ground surface in accordance with the height set point, wherein the height set point depends on (in particular, as previously described, being associated with) at least the at least one environmental meteorological condition of the offshore wind turbine.

In particular, a (central) height control apparatus (e.g. implemented as a software module in a central control device of the offshore wind farm) can be provided. The plurality of offshore wind turbines can be controlled via a communication network, e.g. by transmitting at least one control command containing at least one (previously described) height set point.

According to a preferred embodiment of the offshore wind farm according to the application, the height set point may additionally depend on the position of a first offshore wind turbine in relation to at least one further offshore wind turbine of the offshore wind farm. In other words, then a height set point may be position dependent.

Preferably, the height set point used in controlling a specific offshore wind turbine may depend on the position of that offshore wind turbine within the offshore wind farm. For example, each offshore wind turbine may be associated with a park position attribute (e.g., a geographic indication of the offshore wind turbine, an indication of which row the offshore wind turbine is located with respect to a specific direction (e.g., main wind direction), and/or the like). For example, the turbine identifier of the offshore wind turbine may be stored together with the at least one park position attribute (indicating a park position) in a data memory arrangement that may be accessed by the height control apparatus.

In particular, it has been recognized that the electrical energy yield may be reduced if an offshore wind turbine is located in the lee of another offshore wind turbine under a specific environmental meteorological condition. By taking into account the respective park position of an offshore wind turbine according to the application, the energy yield can be further increased. For example, different vertical distances and thus hub heights can be set for two offshore wind turbines arranged one behind the other (as seen in the current or predicted main wind direction). This can increase the total yield of these two offshore wind turbines.

According to a further embodiment of the offshore wind farm according to the application, at least a first environmental meteorological condition and a second environmental meteorological condition different from the first environmental condition may be predetermined (as previously described).

The height control apparatus may be configured to control the plurality of offshore wind turbines with first height set points according to a first predetermined height setting rule associated with the first environmental meteorological condition upon a detection that the first environmental meteorological condition is satisfied by the specific environmental meteorological parameter, as previously described. In particular, upon detection that the present or predicted meteorological parameters satisfy the first environmental condition, the (at least one) height setting rule associated with that condition (e.g., stored in said data memory arrangement) may be applied to determine the first height set points for preferably all offshore wind turbines.

The first height set points can differ from each other, for example—as explained before—depending on the respective park position of the respective offshore wind turbine.

Furthermore, the height control apparatus can be configured to control the plurality of offshore wind turbines with second height set points at least partially different from the first height set points according to a second predetermined height setting rule associated with the second meteorological environmental condition upon detection that the second meteorological environmental condition is satisfied by the specific meteorological environmental parameter. This can be done in a manner analogous to the previously described controlling with first height set points. As previously described, driving may occur in particular upon detection of a change in the environmental meteorological condition (e.g., from the first to the second or vice versa).

Preferably, the height control apparatus may comprise at least one detection device configured to perform the aforementioned detection.

According to a preferred embodiment of the offshore wind farm according to the application, at least the first height setting rule associated with the first environmental condition and the second height setting rule associated with the second environmental condition can be mapped in the form of an assignment table (determined in advance and) stored in a data memory arrangement of the height control apparatus. In an assignment table, in particular for each environmental condition, each offshore wind turbine (or the corresponding turbine identifier) may be assigned to (exactly) one height set point. The height set points may depend on the park position and the respective park position attribute, respectively, as explained. The assignment table may in particular be stored in the data memory arrangement.

Upon detection of a specific meteorological environmental condition (in particular upon detection of a changed meteorological environmental condition (e.g., from the first to the second meteorological environmental condition or vice versa)), the height control apparatus can access the stored assignment table and, in particular, control at least some of the offshore wind turbines of the offshore wind farm, preferably all of the offshore wind turbines of the offshore wind farm, according to the respective stored height set points.

In the present case, a determination in advance means in particular that the height set points are not determined only upon detection of a specific meteorological environmental condition (in particular upon detection of a changed meteorological environmental condition (e.g. from the first to the second meteorological environmental condition or vice versa)), but rather beforehand.

In particular, before the installation of the offshore wind farm (for example, with the help of a simulation model) and/or immediately after the installation (for example, by testing), the height setting rule can be determined in the form of a plurality of height set points. Preferably, the height set points can be stored in a variable way, so that in particular an optimization can be performed during the operation of the offshore wind farm, in particular by evaluating the actual power yield (compared e.g. with a power yield determined by a simulation process).

According to a further embodiment of the offshore wind farm according to the application, the plurality of offshore wind turbines may be groupable into at least a first subgroup of offshore wind turbines each having an identical first park position attribute (corresponding to the respective park position as previously set forth) and a second subgroup of offshore wind turbines each having an identical second park position attribute (corresponding to the respective park position as previously set forth). The height control apparatus may be configured to control the first subgroup of offshore wind turbines with height set points different from the height set points used to control a second subgroup of offshore wind turbines. It shall be understood that a grouping may be made into three or more subgroups. The grouping may be (inherently) mapped in said assignment table. It shall be understood that the controlling occurs in particular upon detection of a specific environmental condition. Moreover, the grouping may depend on the environmental condition. In other words, a dynamic (rather than static) grouping into subgroups may be made.

A (in the at least one assignment table mappable and preferred) grouping strategy and height adjustment strategy, respectively, can preferably be to always raise the first row of offshore wind turbines (seen in wind direction) to maximum height, to adjust the second row to minimum height and then again the third row to maximum height and so on. It would also be conceivable to always move the first row of offshore wind turbines (as seen in the wind direction) to a minimum height, set the second row to the maximum height and then again the third row to the minimum height, etc.

If further intermediate heights and/or a continuous adjustment of the distance and the heights, respectively, are possible, other grouping strategies and height adjustment strategies, respectively, can also be provided and, in particular, mapped in an assignment table and database, respectively.

According to a particularly preferred embodiment of the offshore wind farm according to the application, the offshore wind farm may comprise at least one height set point determination device configured to (pre)determine the height set points for controlling the plurality of offshore wind turbines at at least one measured or predicted environmental meteorological condition.

The height set point determination device can be configured to perform a plurality of simulation steps based in particular on a simulation model of the plurality of wind turbines of the offshore wind farm. In particular, during planning and prior to an installation, a (mathematical) simulation model of the offshore wind farm can be created with which in principle at least the generated total electrical power can be simulated under different meteorological environmental conditions and in particular with differently set vertical distances. In other variants, the height set point determination device can also be configured to perform tests.

In each simulation step (or test step), different height set points can preferably be set for the plurality of offshore wind turbines and the total electrical power generated for each of the height set points can be determined. For example, the previously mentioned setting strategies can be simulated.

As height set points for (actually) controlling the plurality of offshore wind turbines at a particular meteorological environmental condition, the height set points can be determined (and in particular stored in the assignment table) at which the determined (simulated or tested) generated total electrical power is maximum. In other words, for preferably at least two different meteorological environmental conditions, the respective height set points at which at least the simulated (or tested) total generated electrical power is maximized can be determined by a simulation process (with a plurality of simulation steps).

Preferably, an optimization process can be performed during operation of the offshore wind farm. In particular, the actually generated total electrical power and the simulated (or tested) generated total electrical power can be evaluated. In particular, if the actual generated total electrical power is lower than the simulated generated total electrical power, the height set points can be adjusted (for example, using artificial intelligence) at least partially in order to increase the yield. Here, historical data and/or data from other offshore wind farms can be taken into account.

A further aspect of the application is a method for operating a floatable offshore wind turbine, in particular a previously described floatable offshore wind turbine. The method comprises:

changing, by at least one height adjustment device of the offshore wind turbine, a vertical distance of a floatable foundation of the floatable offshore wind turbine to an underwater ground surface of the underwater ground and/or to a water surface during the anchoring state of the offshore wind turbine based on at least one specific meteorological environmental parameter of the offshore wind turbine.

The method can be used in particular for operating, in particular controlling, a plurality of floating offshore wind turbines, i.e. in particular for operating, in particular controlling, an offshore wind farm described above.

A still further aspect of the application is a floatable foundation for at least one floatable offshore wind turbine, in particular a previously described floatable offshore wind turbine, comprising:

at least one height adjustment device configured to change the vertical distance of the floatable foundation to an underwater ground surface of the underwater ground and/or to a water surface during an anchoring state of the floatable foundation based on at least one specific meteorological environmental parameter of the offshore wind turbine A further advantage of a vertical height adjustment is that this can also improve the horizontal position of the floating offshore wind turbine. In particular, a tilting movement respectively swaying movement of the offshore wind turbine can be reduced. Thus, a tilt angle can be detected and a set tilt angle can be specified. A control module can then adjust the height such that the detected tilt angle at least does not exceed the set tilt angle. Alternatively or additionally, a tilting frequency can also be detected. The position can be stabilized in particular by reducing the vertical distance.

It should be noted that a module, a device, etc. can be at least partially formed by software elements (in particular in the form of computer code executable by a processor) and/or at least partially by hardware elements (processor, memory means, actuator, etc.).

The features of the offshore wind turbines, offshore wind farms, methods and foundations can be freely combined with each other. In particular, features of the description and/or of the dependent claims may be independently inventive, even by completely or partially circumventing features of the independent claims, in sole position or freely combined with each other.

BRIEF DESCRIPTION OF THE DRAWINGS

There are now a multitude of possibilities to design and further develop the offshore wind turbine according to the application, the offshore wind farm according to the application, the process according to the application and the foundation according to the application. For this purpose, reference is made on the one hand to the patent claims subordinate to the independent patent claims, and on the other hand to the description of embodiments in connection with the drawing. In the drawings:

FIG. 4 shows a schematic view of an embodiment of an offshore wind farm according to the present application.

DETAILED DESCRIPTION

Figure 1A:
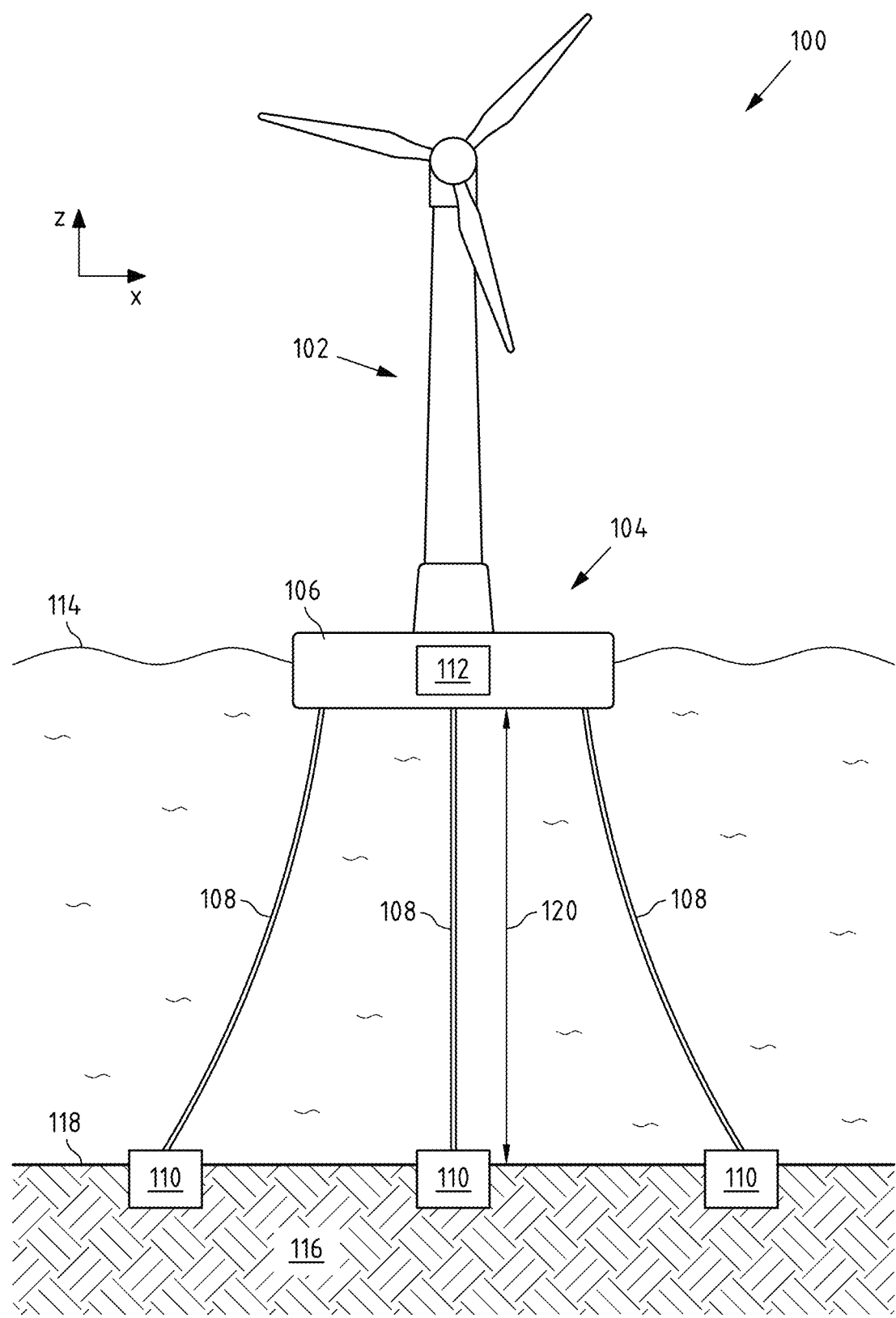
FIG. 1a shows a schematic view of an embodiment of a floatable offshore wind turbine according to the present application.
Figure 1B:
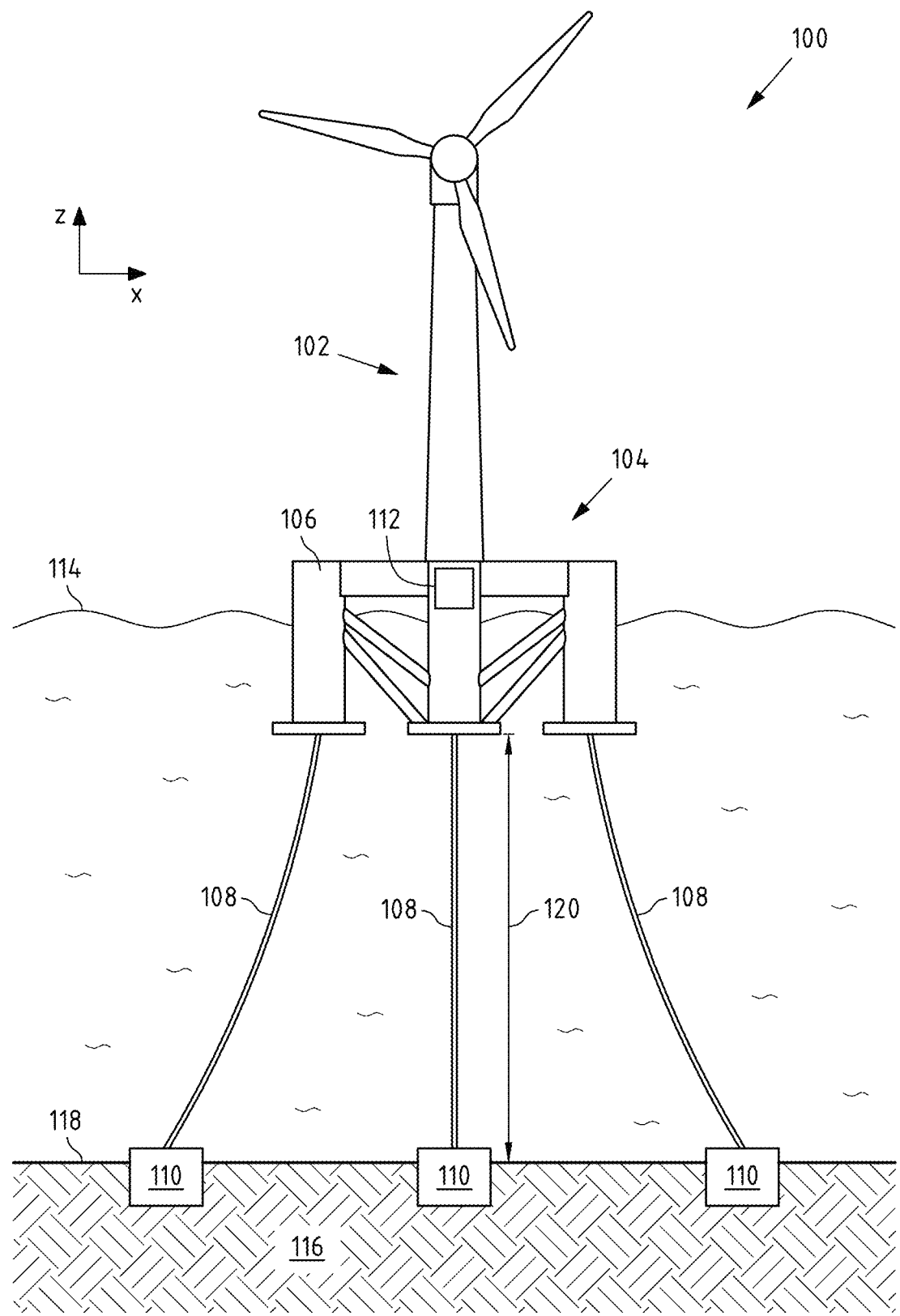
FIG. 1b shows a schematic view of a further embodiment of a floatable offshore wind turbine according to the present application.
Figure 1C:
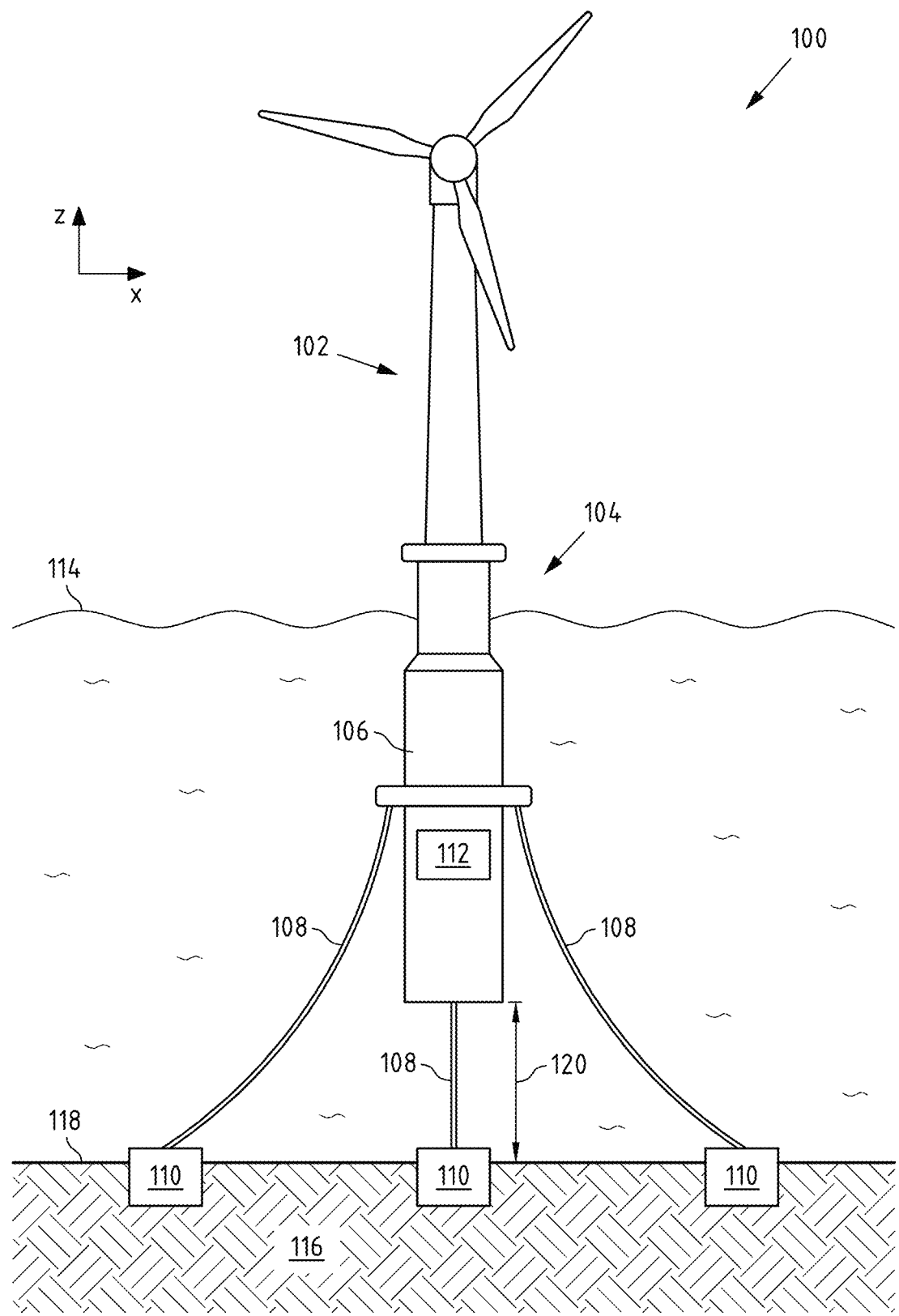
FIG. 1c shows a schematic view of a further embodiment of a floatable offshore wind turbine according to the present application.
Figure 1D:
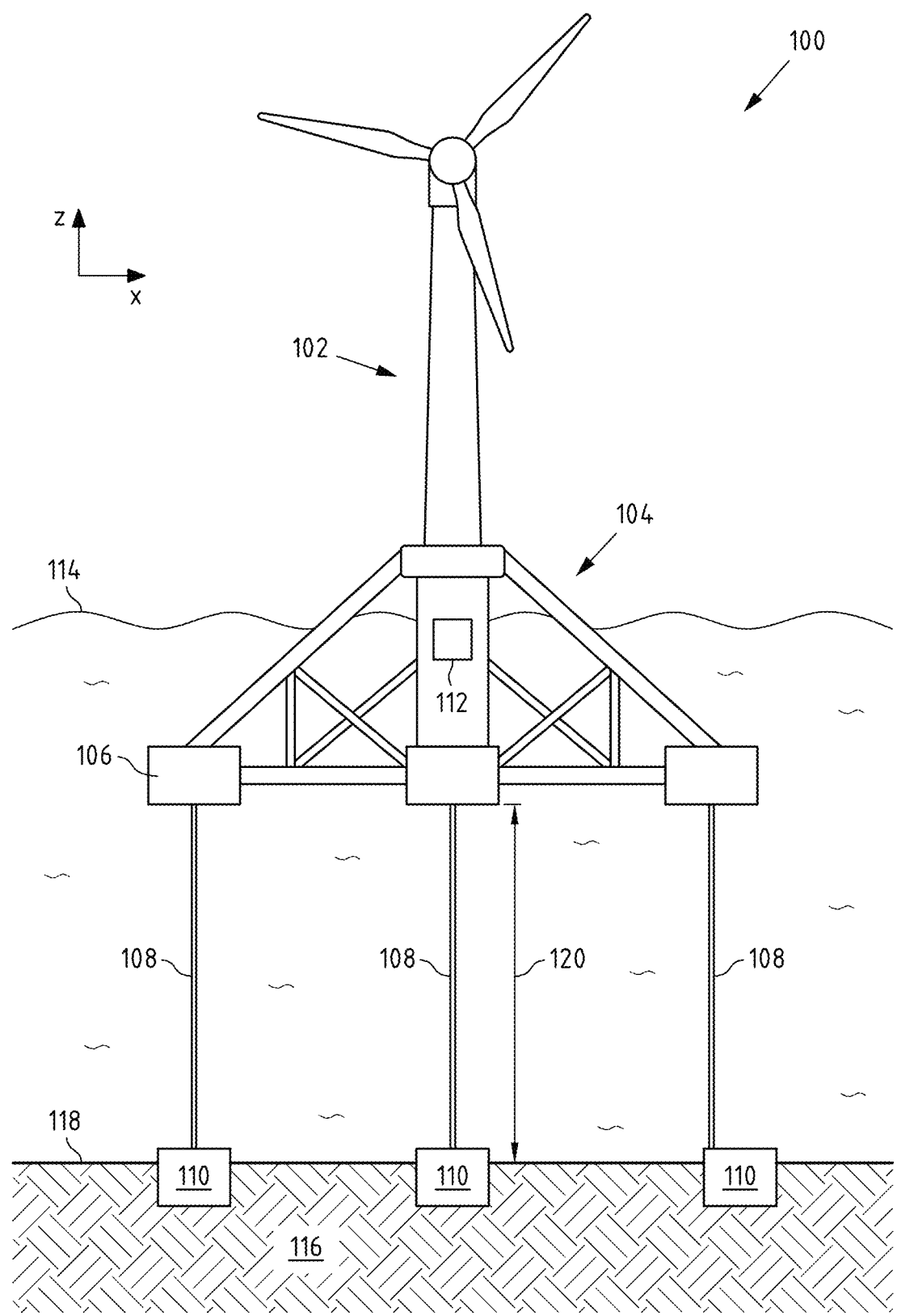
FIG. 1d shows a schematic view of a further embodiment of a floatable offshore wind turbine according to the present application.

In the Figures, the same reference signs are used for the same elements.

FIGS. 1a to 1d show schematic views of embodiments of floatable offshore wind turbines 100 according to the present application. The illustrated offshore wind turbines 100 differ in their respective floatable foundations 104 each comprising at least one floating body 106. In particular, a floatable foundation 104 at least substantially forms the floating body 106.

In particular, a barge foundation 104 (FIG. 1a), a semi-submersible foundation 104 (FIG. 1b), a spar foundation 104 (FIG. 1c), and a tension leg platform foundation 104 (FIG. 1d) are shown. It shall be understood that other floatable foundations may be provided in other variants of the application.

As can be seen, a wind power device 102 comprising a tower, nacelle, rotor, generator, etc., is arranged on the at least one floatable foundation 104.

In the present embodiment, a floatable foundation 104 is respectively attached and anchored, respectively, to the underwater ground 116 by means of a plurality of anchoring arrangements 108. An illustrated anchoring arrangement 108 comprises an anchoring connection 109 in particular in the form of an anchor rope 109 or an anchor chain 109. One end of the anchor connection 109 is fixed to the foundation 104 and the other end is fixed to at least one anchor 110 (e.g., weight anchor, torpedo anchor, etc.). The anchor 110 may be at least partially buried in the underwater ground 116, as can be seen from FIGS. 1a to 1d.

Furthermore, in FIGS. 1a to 1d, the underwater ground surface is denoted by reference sign 118 and the water surface and waterline, respectively, is denoted by reference sign 114.

According to the application, a depicted offshore wind turbine 100 comprises at least one height adjustment device 112, respectively. The height adjustment device 112 is configured to change the vertical distance 120 of the floatable foundation 104 to the underwater ground surface 118 (in particular, the distance 120 is the distance between the lower surface and the lowest point, respectively, of the foundation 104 and the current underwater ground surface 118) during the illustrated anchoring state of the offshore wind turbine 100.

Here, the changing of the vertical distance 120 is based on at least one specific meteorological environmental parameter of the offshore wind turbine 100, such as a wind direction (measured and/or predicted), wind strength (measured and/or predicted), and/or wave height (measured and/or predicted).

Preferably, at least a first environmental meteorological condition and a second environmental meteorological condition different from the first environmental meteorological condition may be predetermined. Upon detection that the first meteorological environmental condition is satisfied by the specific meteorological environmental parameter, the height adjustment device 112 may be configured to change the vertical distance 120 by adjusting a first vertical distance 120 associated with the first meteorological environmental condition (for example, corresponding to a received height set point).

Upon detection that the second environmental meteorological condition is satisfied by the specific environmental meteorological parameter, the height adjustment device 112 may be arranged to change the vertical distance 120 by adjusting a second vertical distance 120 associated with the second environmental meteorological condition (for example, corresponding to a received height set point). As has already been described, the changing may be done in particular upon a change in the actual environmental meteorological condition present.

As can be seen from FIGS. 1a to 1d, the hub height of an offshore wind turbine 100 can be adjusted by changing the vertical distance 120. By doing this depending on the current and/or predicted meteorological conditions at the installation site of the offshore wind turbine 100, the achievable power yield of the offshore wind turbine 100, in particular of the entire offshore wind farm (not shown here), can be increased.

In the present embodiment, the height adjustment device 112 is integrated in the foundation 104. In other variants of the application, the at least one height adjustment device may be arranged on the foundation, for example at least partially attached to an outer side of the foundation.

Figure 2A:
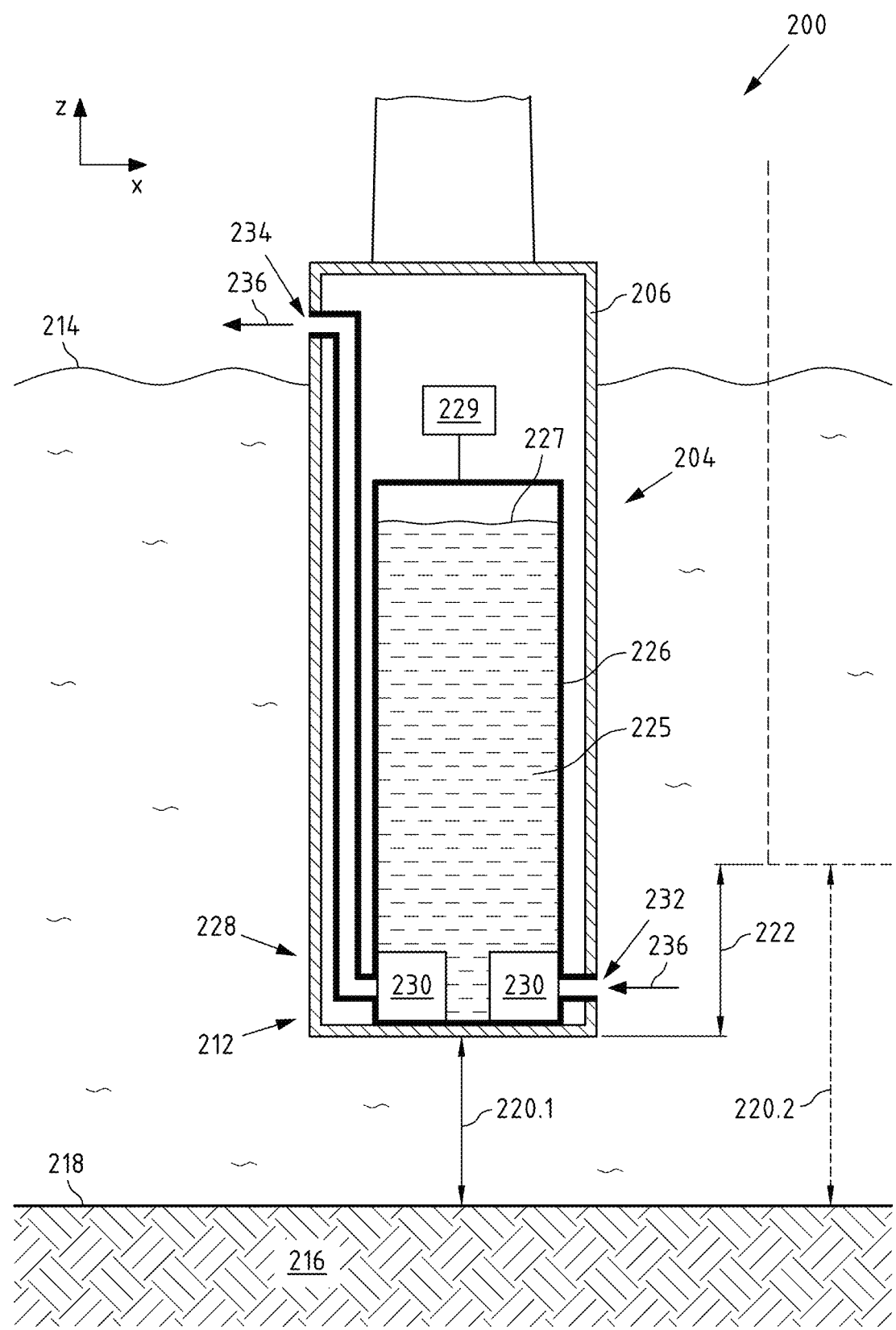
FIG. 2a shows a schematic view of a further embodiment of a floatable offshore wind turbine according to the present application with a first set distance.
Figure 2B:
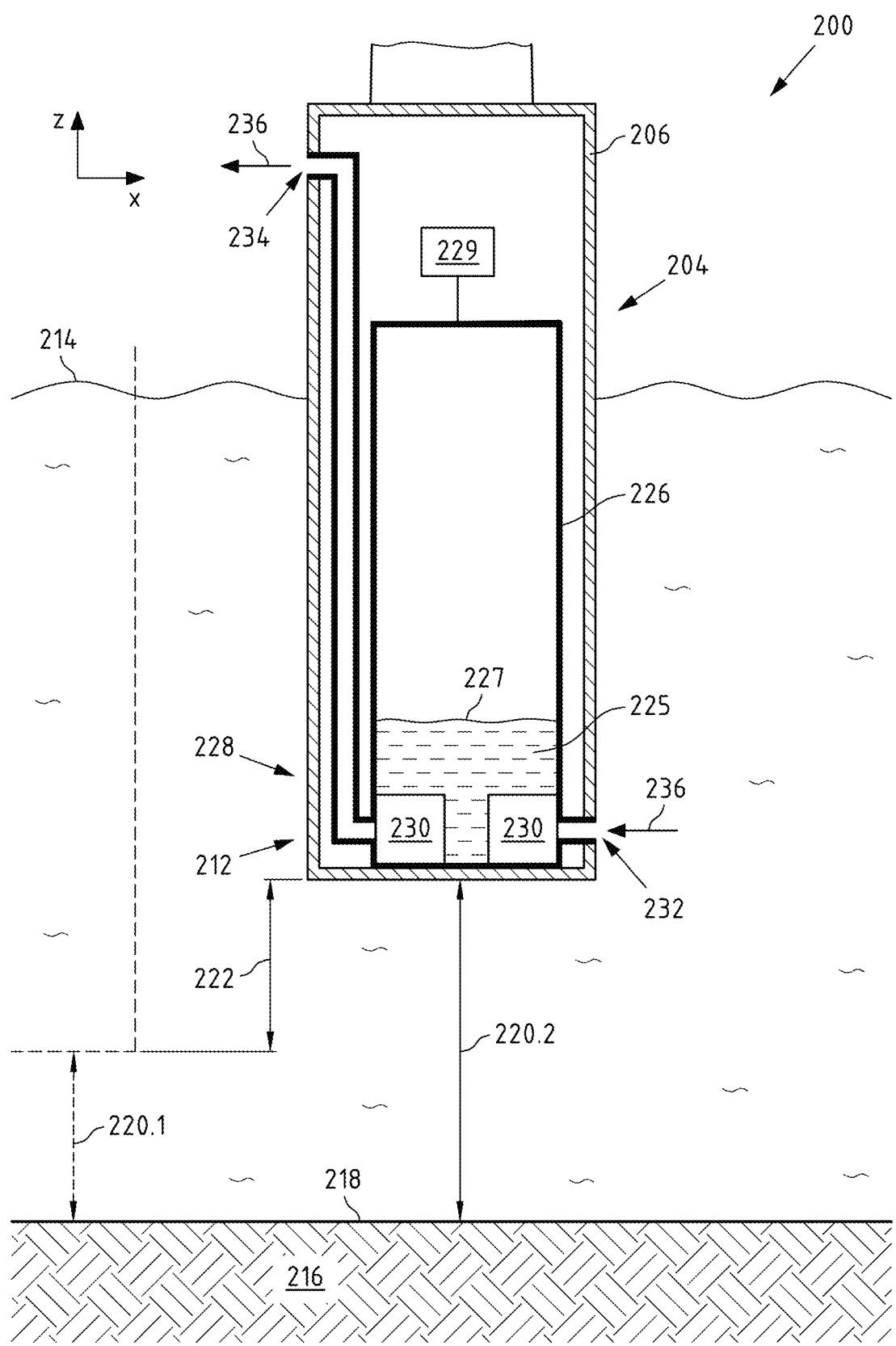
FIG. 2b shows a schematic view of the embodiment according to FIG. 2a with a further set distance.

FIGS. 2a and 2b show a further embodiment example of a floatable offshore wind turbine 200 with differently adjusted vertical distances 220. In order to avoid repetitions, essentially only the differences from the previous embodiments according to FIGS. 1a to 1d are described below and otherwise reference is made to the previous explanations. It should be noted that only for the sake of a better overview a representation of the entire wind power device and the representation of anchoring arrangements has been omitted.

The difference between the distances 220 in FIGS. 2a and 2b is denoted by the reference sign 222. The adjustable difference can preferably be between 2 m and 40 m, preferably between 5 m and 30 m.

For adjusting the vertical distance 220, a height adjustment device 212 is provided in the present case. The illustrated height adjustment device 212 comprises at least one ballast tank 226 which can be filled with a ballast medium 225 and is preferably arranged in the foundation 204. Furthermore, the height adjustment device 212 comprises at least one ballast medium conveying arrangement 228, which is in particular configured to change the filling level 227 of the ballast tank 226.

In particular, the ballast medium conveying arrangement 228 comprises two pumping devices 230. In particular, one pumping device 230 is configured to change the filling level 227 of the ballast tank 226 by actively pumping the ballast medium 225 (in particular water) into the ballast tank 226 (indicated by the arrow 236). In particular, an opening 232 may be arranged in the foundation 204 through which the ballast medium 225 may be pumped into the ballast tank 226.

In particular, the further pumping device 230 is configured to change the level 227 of the ballast tank 226 by actively pumping the ballast medium 225 out of the ballast tank 226 (indicated by the arrow 237). In particular, a further opening 234 may be arranged in the foundation 204 through which the ballast medium 225 may be pumped out of the ballast tank 226.

Preferably, a control module 229 may be provided. The (local) control module 229 of the height adjustment device 212 can, for example, be controllable by a (not shown) height control apparatus with a height set point (e.g. a specific filling quantity (e.g. full, half full, empty, x liters etc.) or the like).

Depending on a current fill level 227 measurable by a (not shown) level measuring element of the control module 229 and a received height set point, a pumping device 230 can be controlled in such a way that the fill level 227 is changed according to the received height set point. As has already been described, by changing the vertical distance 220 (between at least two adjustable distances), the hub height of an offshore wind turbine 200 is adjusted and thereby, in particular, the power yield is increased.

Figure 3A:
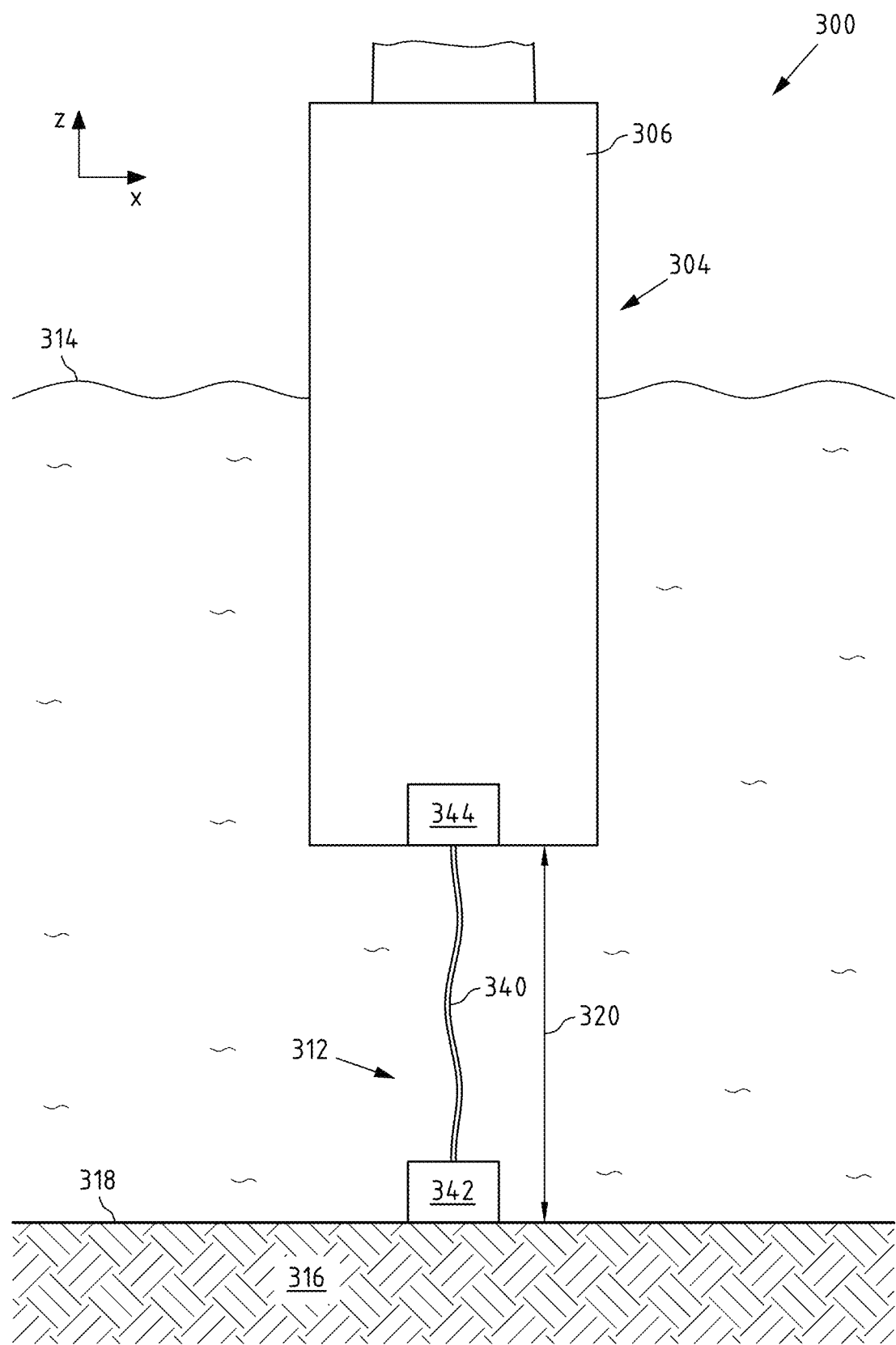
FIG. 3a shows a schematic view of a further embodiment of a floatable offshore wind turbine according to the present application with a first set distance.
Figure 3B:
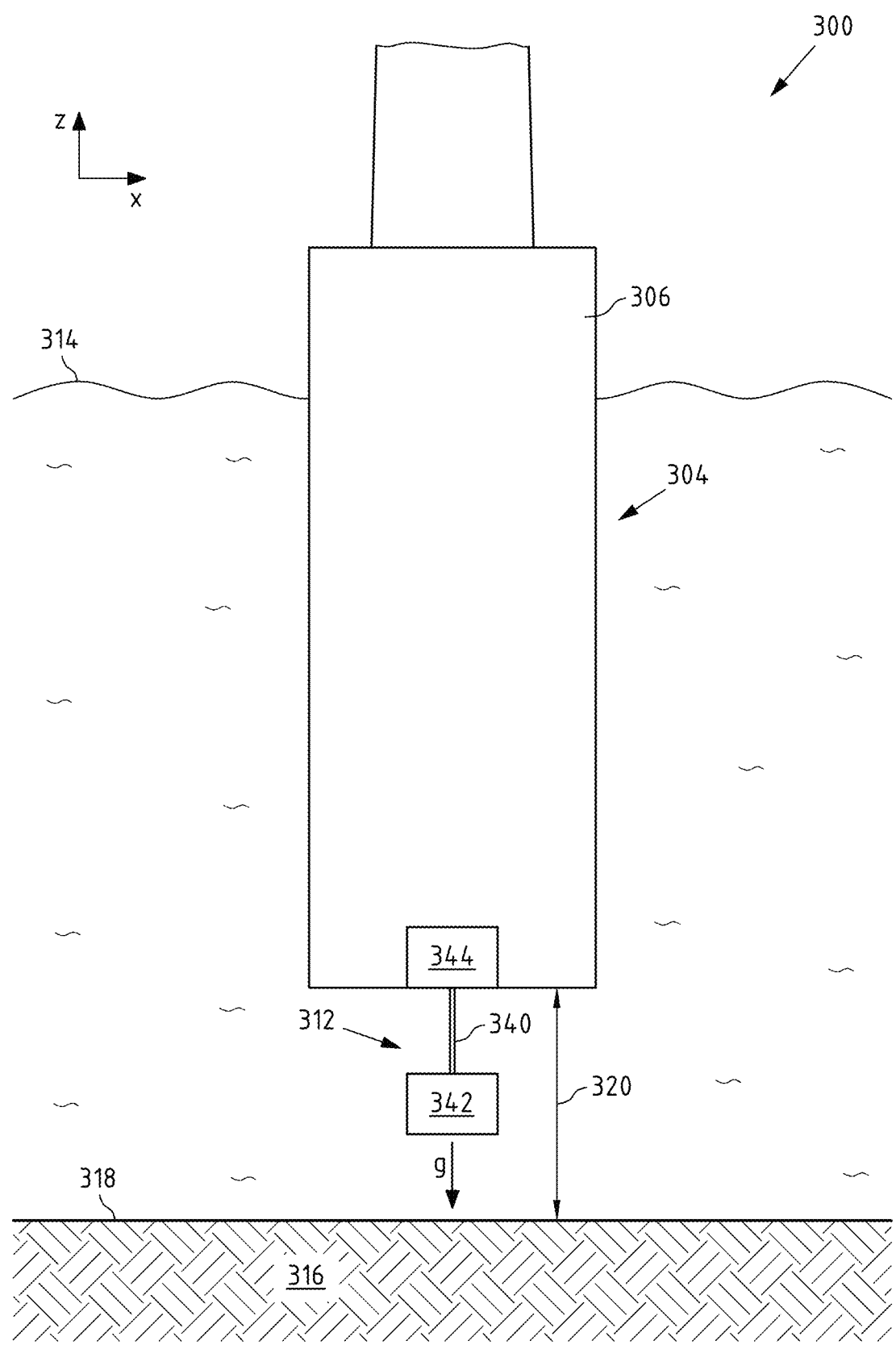
FIG. 3b shows a schematic view of the embodiment according to FIG. 3a with a further set distance.

FIGS. 3a and 3b show a further embodiment of a floatable offshore wind turbine 300 with differently adjusted vertical distances 320. In order to avoid repetitions, essentially only the differences from the previous embodiments according to FIGS. 1a to 2b are described below and otherwise reference is made to the previous explanations. It should be noted that only for the sake of a better overview a representation of the entire wind power device and the representation of anchoring arrangements has been omitted.

In the present embodiment, the height adjustment device 312 comprises at least one weight arrangement 312 connected to the floatable foundation 304. In particular, the weight arrangement 312 may comprise a weight connection 340 (e.g., an anchor rope 340 and/or an anchor chain 340) that may be connected to the foundation 304. The other end of the weight connection 340 may be connected to a weight element 342 of the weight arrangement 312.

In a lowered state of the weight arrangement 312, in particular almost no weight force is exerted on the foundation 340 by the at least one weight element 342 of the weight arrangement 312. In a lifted state of the weight arrangement 312, for example caused by a lifting device 344 (e.g. a winch 344), in particular a weight force g (corresponding to the weight of the weight element 342 of the weight arrangement) is exerted by the at least one weight element 342 of the weight arrangement 312 on the foundation 304. By an adjustment, by the lifting device 344, between said states of the weight arrangement 312, a change of said vertical distance 320 can be caused at least between two discrete values.

Again, a (not shown) control module may be provided that can control the lifting device 344 depending on a received height set point (e.g., lowering or not lowering).

It shall be understood that the embodiments according to FIGS. 2a, 2b and 3a, 3b can be combined with each other.

In further (not shown) variants of the application, alternatively or additionally, the length of an anchor connection (cf. FIGS. 1a to 1d) can be changed by a winch device in order to change the vertical distance (or to trace the anchor connection according to the changed distance).

The offshore structure may comprise a winch arrangement. In particular, each anchoring arrangement may have a winch device associated therewith. Preferably, each anchor connection may be coupled to a respective winch device. In particular, an anchor connection may be coupled to a cylindrical drum (winch) of a winch device to wind and unwind the anchor connection between a minimum length and a maximum length (and thereby, in particular, to change the vertical distance).

For this purpose, each winch device can have a drive and a parking brake. In order to change a length, a control module of the height adjustment device can first control the corresponding parking brake to cause a release of this parking brake. Then, the control module can control the corresponding drive (preferably an electric motor) to cause winding or unwinding by a specific length. Subsequently, the parking brake can be locked again, controlled by the control module.

FIG. 4 shows a schematic view of an embodiment of an offshore wind farm 450 according to the present application. The shown offshore wind farm 450 comprises a plurality of offshore wind turbines 400.1 to 400.4. In order to avoid repetitions, reference is made in particular to the previous embodiments with respect to the offshore wind turbines 400.1 to 400.4.

Furthermore, the illustrated offshore wind farm 450 comprises at least one height control apparatus 452, for example implemented in a (anyway provided) (not illustrated) farm control system of the offshore wind farm 450.

In the present embodiment, the height control apparatus 452 comprises a communication module 454, a height control module 458, a detection device 460, a height set point determination device 462, and a data memory arrangement 464. It shall be understood that other variants may provide additional or fewer modules/devices.

The height set point determination device 462, which may alternatively be implemented in another computing device, may be configured to determine at least one height setting rule depending on at least one environmental meteorological condition (at the installation site of the offshore wind farm 450).

The determining of the at least one height adjustment rule may preferably be performed prior to the installation of the offshore wind farm 450, but may also be performed during the installation and/or (immediately) after the installation of the offshore wind farm 450. As already explained above, an optimization process may be performed (continuously) during operation. In particular, the at least one height adjustment rule is determined such that the total yield of the offshore wind farm 450 can be maximized.

Preferably, determining the at least one height adjustment rule, depending on at least one environmental meteorological condition (at the installation site of the offshore wind farm 450) may comprise determining height set points for preferably all offshore wind turbines 400.1 to 400.4.

In particular, the respective determined height set point may additionally depend on the (park) position of the respective offshore wind turbine 400.1 to 400.4, in particular in relation to at least one further offshore wind turbine 400.1 to 400.4 of the offshore wind farm 450. For example, a plan and/or a model of the offshore wind farm 450 may be stored (for example in the data memory arrangement 464 or another memory arrangement), in which a park position attribute is assigned to each offshore wind turbine 400.1 to 400.4. From the respective park position attribute, the park position is at least derivable. In particular, the respective park position attribute can be used to (dynamically) form at least two subgroups of offshore wind turbines 400.1 to 400.4. In particular, this means that the offshore wind turbines 400.1 to 400.4 of a subgroup are set to essentially the same vertical distance, i.e. are controlled with essentially the same height set point. In particular, the grouping can be (inherently) mapped in an assignment table and database, respectively.

As has already been described, the determination of the height set points may be such as to maximize the power yield. In particular, the at least one height set point determination device 462 may be configured to (pre)determine the height set points for controlling the plurality of offshore wind turbines 400.1 to 400.4 depending on at least one measured or predicted environmental meteorological condition. The height set point determination device 462 may be configured to perform a plurality of simulation steps, based in particular on a simulation model of the plurality of wind turbines 400.1 to 400.4 of the offshore wind farm 450. In other variants of the applications, actual tests may also be performed to determine the power yield, as described above.

In particular, during planning and prior to an installation, a (mathematical) simulation model of the offshore wind farm 450 can be created, with which in principle at least the generated total electrical power can be simulated under different meteorological environmental conditions and in particular with differently adjusted vertical distances.

In each simulation step, different height set points can preferably be set for the plurality of offshore wind turbines 400.1 to 400.4 and the total electrical power generated for the height set points in each case can be determined.

As height set points for (actually) controlling the plurality of offshore wind turbines for the environmental meteorological condition, the height set points may be determined and stored, in particular in an assignment table in the data memory arrangement 464, for which the determined total generated electrical power is maximum.

In other words, for preferably at least two different meteorological environmental conditions, the respective height set points for which at least the simulated generated total electrical power is maximized can be determined by a simulation process (with a plurality of simulation steps). In the assignment table, a height set point can be assigned to each (given) environmental condition for each offshore wind turbine 400.1 to 400.4.

In particular, by determining the height set points, a grouping strategy and height adjustment strategy, respectively, can be specified and mapped. By way of example, the first row of offshore wind turbines 400.1, 400.2 in wind direction (i.e. at a specific detected environmental condition) can always be controlled in such a way that the vertical distance is maximized (i.e. the hub height is maximized). The second row of offshore wind turbines 400.3, 400.4 in wind direction (i.e. at a specific detected environmental condition) can be controlled in such a way that the vertical distance is minimized (i.e. the hub height is minimized). In other variants, the setting can also be exactly the opposite. If further intermediate heights and/or a continuous adjustment of the distance or heights are possible, other division or height adjustment strategies can also be provided.

Figure 5:
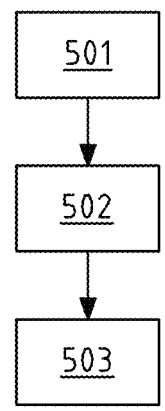
FIG. 5 shows a diagram of an embodiment of a method according to the present application.

The functioning and in particular the operation of the offshore wind farm 450 are described in more detail below with the aid of FIG. 5. FIG. 5 shows a diagram of an embodiment of a method according to the present application, in particular for operating at least one offshore wind turbine 400.1 to 400.4. Only by way of example, the method is described in more detail with reference to an operation of the offshore wind farm 450.

In a first step 501, a providing of at least one specific meteorological environmental parameter of the offshore wind farm 450 may be performed. In particular, the at least one environmental meteorological parameter may be provided to the height control apparatus 452 via the communication module 454. The at least one specific environmental meteorological parameter may be a current environmental meteorological parameter measured by at least one measurement device and/or a predicted environmental meteorological parameter. Preferably, a plurality of environmental meteorological parameters (measured and predicted) may be provided, such as wind direction (measured and/or predicted), wind strength (measured and/or predicted), wave height (measured and/or predicted).

In a step 502, it can be detected, by the detection device 460, in particular whether at least one of the (predetermined) meteorological environmental conditions is fulfilled by the at least one specific and provided meteorological environmental parameter. A meteorological environmental condition (or criterion) comprises in particular at least one meteorological environmental parameter range. The detection at step 502 may check whether or not the specific environmental meteorological parameter is within the at least one environmental parameter range. In other words, it may be checked whether or not the at least one environmental meteorological parameter (value) satisfies the at least one environmental condition.

Here, in step 502, it can be detected in particular whether the meteorological environmental condition has changed so that a change in the vertical distances is required. If it is detected in step 502 that the meteorological environmental condition has not changed, in particular no change of the vertical distances is required. Then the method can be continued with step 501.

In particular, upon a determination that the environmental meteorological condition has changed from a previously detected environmental meteorological condition, for example, from a first environmental meteorological condition to a second environmental meteorological condition (e.g., when the wind strength and/or wind direction has or will change to an extent provided by the defined environmental conditions), it can be continued with step 503.

In step 503, at least one height adjustment device of an offshore wind turbine 400.1 to 400.4 is controlled, in particular by the height control module 458 of the height control apparatus 452, with a height set point for causing a change in a vertical distance of the floatable foundation of the offshore wind turbine 400.1 to 400.4 to the underwater ground surface in accordance with the height set point, wherein the height set point depends at least on the at least one meteorological environmental condition of the offshore wind turbine. In particular, at least each offshore wind turbine 400.1 to 400.4 for which a change in vertical distance is to be effected may be controlled by the height control module 458.

Preferably, the height control module 458 may access the described assignment table stored in the data memory arrangement 364 to determine the height set points to be used for controlling. Then, the height control module 458 may cause a sending of corresponding control commands each including at least one height set point (previously described). The control commands may be transmitted to the respective offshore wind turbines 400.1 to 400.4 via the communication module 454 and the communication network 456. The respective height adjustment devices can then—in a previously described manner—adjust the vertical distance.

In particular, depending on the wind direction, the individual heights of the wind turbine hubs can be adjusted to maximize the yield. As has already been described, conceivable height settings are continuous or discrete, e.g. by means of two or three preset heights or distances.

In addition, it can be provided that in case of too strong wind and/or too strong waves (given by e.g. a third meteorological environmental condition) all offshore wind turbines 400.1 to 400.4 reduce their vertical distance, in particular minimize it, because the nominal power is reached and/or in order to avoid damages.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An offshore wind farm, comprising:
a plurality of offshore wind turbines, wherein each floatable offshore wind turbine comprises:
at least one floatable foundation comprising at least one floating body, and
at least one anchoring arrangement configured to fix the offshore wind turbine to an underwater ground in an anchoring state of the offshore wind turbine,
at least one height adjustment device configured to change the vertical distance of the floatable foundation to an underwater ground surface of the underwater ground and/or to a water surface during the anchoring state based on at least one specific meteorological environmental parameter of the offshore wind turbine,
wherein the offshore wind farm further comprises:
at least one height control apparatus configured to control at least one first height adjustment device of an offshore wind turbine with a height set point for causing a change in a vertical distance of a floatable foundation of the offshore wind turbine to an underwater ground surface of the underwater ground and/or to a water surface in accordance with the height set point, wherein the height set point depends at least on the at least one environmental meteorological condition of the offshore wind turbine,
wherein
the height set point additionally depends on the position of a first offshore wind turbine in relation to at least one further offshore wind turbine of the offshore wind farm, and
the height adjustment device comprises at least one weight arrangement connected to the floatable foundation, wherein the weight arrangement is changeable between at least a state lowered on the underwater ground surface and a state lifted from the underwater ground surface.

2. The offshore wind farm of claim 1, wherein
at least a first environmental meteorological condition and a second environmental meteorological condition different from the first environmental condition are specified,
upon a detection that the first environmental meteorological condition is satisfied by the specific environmental meteorological parameter, the height adjustment device is configured to change the vertical distance by adjusting a first vertical distance associated with the first environmental meteorological condition; and
upon detection that the second environmental meteorological condition is satisfied by the specific environmental meteorological parameter, the height adjustment device is configured to change the vertical distance by adjusting a second vertical distance associated with the second environmental meteorological condition.

3. The offshore wind farm of claim 1, wherein
the at least one specific environmental meteorological parameter is selected from the group comprising:
wind direction,
wind strength,
wave height.

4. The offshore wind farm of claim 1, wherein
the height adjustment device comprises at least one ballast tank which can be filled with a ballast medium, and
the height adjustment device comprises at least one ballast medium conveying arrangement configured to change the filling level and/or the total density of the ballast tank.

5. The offshore wind farm of claim 4, wherein
the ballast medium conveying arrangement comprises at least one pumping device configured to change the filling level of the ballast tank by actively conveying the ballast medium into the ballast tank and/or by actively conveying the ballast medium out of the ballast tank.

6. The offshore wind farm of claim 1, wherein
at least a first environmental meteorological condition and a second environmental meteorological condition different from the first environmental condition are specified,
the height control apparatus is configured to control the plurality of offshore wind turbines with first height set points according to a first predetermined height setting rule associated with the first environmental meteorological condition upon a detection that the first environmental meteorological condition is satisfied by the specific environmental meteorological parameter,
the height control apparatus is configured to control the plurality of offshore wind turbines with second height set points at least partially different from the first height set points in accordance with a second predetermined height setting rule associated with the second environmental meteorological condition upon detection that the second environmental meteorological condition is satisfied by the specific environmental meteorological parameter.

7. The offshore wind farm of claim 6, wherein
at least the first height setting rule associated with the first environmental condition and the second height setting rule associated with the second environmental condition are mapped in the form of a predetermined assigning table stored in a data memory arrangement of the height control apparatus.

8. The offshore wind farm of claim 1, wherein
the plurality of offshore wind turbines is groupable into at least a first subgroup of offshore wind turbines each having an identical first park position attribute and a second subgroup of offshore wind turbines each having an identical second park position attribute, and
the height control apparatus is configured to control the first subgroup of offshore wind turbines with height set points different from the height set points used to control a second subgroup of offshore wind turbines.

9. The offshore wind farm of claim 1, wherein
the offshore wind farm comprises at least one height set point determination device configured to determine the height set points for controlling the plurality of offshore wind turbines at at least one measured or predicted environmental meteorological condition,
the height set point determination device is configured to perform a plurality of simulation steps based on a simulation model of the plurality of offshore wind turbines of the offshore wind farm,
wherein different height set points are set for the plurality of offshore wind turbines in each simulation step and the total electrical power generated for the height set points is determined, and
the height set points for controlling the plurality of offshore wind turbines at the environmental meteorological condition are determined to be the height set points at which the determined total generated electrical power is maximum.

10. A method of operating an offshore wind farm of claim 1, the method comprising:
changing, by at least one height adjustment device of the offshore wind turbine, a vertical distance of a floatable foundation of the floatable offshore wind turbine to an underwater ground surface of the underwater ground and/or to a water surface during the anchoring state of the offshore wind turbine based on at least one specific meteorological environmental parameter of the offshore wind turbine,
wherein the height adjustment device comprises at least one weight arrangement connected to the floatable foundation, wherein the weight arrangement is changeable between at least a state lowered on the underwater ground surface and a state lifted from the underwater ground surface.

* * * * *